(12) United States Patent
Yu et al.

(10) Patent No.: US 9,334,399 B2
(45) Date of Patent: May 10, 2016

(54) PHOTOSENSITIVE RESIN COMPOSITION AND BLACK SPACER USING THE SAME

(71) Applicant: Cheil Industries Inc., Gumi-si (KR)

(72) Inventors: A-Rum Yu, Uiwang-si (KR); Ji-Hye Kim, Uiwang-si (KR); Kyung-Won Ahn, Uiwang-si (KR); Jae-Bum Yim, Uiwang-si (KR); Hwan-Sung Cheon, Uiwang-si (KR); Ju-Ho Jung, Uiwang-si (KR); Hyun-Moo Choi, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/064,325

(22) Filed: Oct. 28, 2013

(65) Prior Publication Data

US 2014/0163131 A1    Jun. 12, 2014

(30) Foreign Application Priority Data

Dec. 12, 2012   (KR) .......................... 10-2012-0144737

(51) Int. Cl.
| | | |
|---|---|---|
| C08L 33/00 | (2006.01) | |
| C09K 3/00 | (2006.01) | |
| G03F 7/027 | (2006.01) | |
| G03F 7/028 | (2006.01) | |
| C08L 33/08 | (2006.01) | |
| C08K 5/00 | (2006.01) | |

(52) U.S. Cl.
CPC ............... *C08L 33/08* (2013.01); *C08K 5/0025* (2013.01)

(58) Field of Classification Search
None
See application file for complete search history.

(56) References Cited

U.S. PATENT DOCUMENTS

| | | | |
|---|---|---|---|
| 3,950,321 A | 4/1976 | Dehnert et al. | |
| 4,404,136 A | 9/1983 | Idelson et al. | |
| 4,500,897 A | 2/1985 | Matsuda et al. | |
| 4,762,752 A | 8/1988 | Haubennestel et al. | |
| 5,112,362 A | 5/1992 | Hahn et al. | |
| 5,278,009 A | 1/1994 | Iida et al. | |
| 5,403,363 A | 4/1995 | Loeffler et al. | |
| 5,424,167 A | 6/1995 | Uetani et al. | |
| 5,663,019 A | 9/1997 | Matsumura et al. | |
| 5,707,432 A | 1/1998 | Adams et al. | |
| 5,708,055 A | 1/1998 | Joyce et al. | |
| 5,710,234 A | 1/1998 | Fujishiro et al. | |
| 5,716,753 A | 2/1998 | Yoshimoto et al. | |
| 5,721,076 A | 2/1998 | Watanabe et al. | |
| 5,803,959 A | 9/1998 | Johnson et al. | |
| 5,851,280 A | 12/1998 | Belmont et al. | |
| 5,876,895 A | 3/1999 | Hishiro et al. | |
| 5,895,522 A | 4/1999 | Belmont et al. | |
| 5,922,118 A | 7/1999 | Johnson et al. | |
| 5,968,243 A | 10/1999 | Belmont et al. | |
| 5,998,091 A | 12/1999 | Suzuki | |
| 6,033,813 A | 3/2000 | Endo et al. | |
| 6,110,994 A | 8/2000 | Cooke et al. | |
| 6,232,025 B1 | 5/2001 | Srinivasan | |
| 6,277,183 B1 | 8/2001 | Johnson et al. | |
| 6,328,894 B1 | 12/2001 | Chan et al. | |
| 6,596,446 B2 | 7/2003 | Wolf et al. | |
| 6,733,935 B2 | 5/2004 | Kishimoto et al. | |
| 6,770,405 B2 | 8/2004 | Ueda et al. | |
| 6,780,389 B2 | 8/2004 | Karl et al. | |
| 6,960,250 B2 | 11/2005 | Luethge et al. | |
| 7,026,459 B2 | 4/2006 | Dreier et al. | |
| 7,132,154 B2 | 11/2006 | Shibahara et al. | |
| 7,250,209 B2 | 7/2007 | Shibahara et al. | |
| 7,376,328 B2 | 5/2008 | Takase et al. | |
| 7,517,619 B2 | 4/2009 | Hosaka et al. | |
| 7,592,119 B2 | 9/2009 | Nomura | |
| 7,713,343 B2 | 5/2010 | Goto et al. | |
| 7,749,682 B2 | 7/2010 | Miyabe et al. | |
| 7,794,917 B2 | 9/2010 | Mori et al. | |
| 7,851,789 B2 | 12/2010 | Lee et al. | |
| 8,153,340 B2 | 4/2012 | Takahashi et al. | |
| 8,273,270 B2 | 9/2012 | Lee et al. | |
| 8,298,454 B2 | 10/2012 | Lee et al. | |
| 8,399,170 B2 | 3/2013 | Iwase et al. | |
| 8,758,966 B2 | 6/2014 | Cho et al. | |
| 2002/0187412 A1 | 12/2002 | You et al. | |
| 2003/0113640 A1 | 6/2003 | Sabnis et al. | |
| 2004/0126592 A1 | 7/2004 | Shibahara et al. | |
| 2005/0164120 A1 | 7/2005 | Yamaoka et al. | |
| 2005/0175908 A1 | 8/2005 | Seto et al. | |
| 2006/0041053 A1 | 2/2006 | Kamata et al. | |
| 2007/0101903 A1 | 5/2007 | Lee et al. | |
| 2007/0161110 A1 | 7/2007 | Iida et al. | |

(Continued)

FOREIGN PATENT DOCUMENTS

| | | |
|---|---|---|
| CN | 1606597 | 4/2005 |
| CN | 1606600 | 4/2005 |

(Continued)

OTHER PUBLICATIONS

International Search Report in commonly owned International Application No. PCT/KR2011/003144 dated Jan. 18, 2012, pp. 1-2.
Search Report issued in commonly owned Taiwanese Application No. 10115806 dated Dec. 20, 2013, pp. 1.
English-translation of Search Report issued in commonly owned Taiwanese Application No. 10115806 dated Dec. 20, 2013, pp. 1.
Search Report in commonly owned Taiwanese Application No. 100122649 dated Nov. 29, 2013, pp. 1-2.
Chinese Search Report in commonly owned Chinese Application No. 201110169839.4 dated Mar. 14, 2013, pp. 1-4.

(Continued)

*Primary Examiner* — Ana Woodward
(74) *Attorney, Agent, or Firm* — Additon, Higgins & Pendleton, P.A.

(57) ABSTRACT

Disclosed are a photosensitive resin composition including (A) a thermally curing initiator having a half-life of about one hour at a temperature ranging from about 100 to about 150° C.; (B) a photopolymerization initiator; (C) a binder resin; (D) a photopolymerizable compound; (E) a colorant; and (F) a solvent, and a black spacer using the same.

9 Claims, 1 Drawing Sheet

(56) References Cited

U.S. PATENT DOCUMENTS

| | | |
|---|---|---|
| 2008/0010756 A1 | 1/2008 | Hall-Goulle et al. |
| 2008/0090177 A1 | 4/2008 | Oh et al. |
| 2008/0138725 A1 | 6/2008 | Fujiwara et al. |
| 2008/0179572 A1 | 7/2008 | Kim et al. |
| 2009/0207490 A1 | 8/2009 | Moriyama et al. |
| 2010/0085518 A1 | 4/2010 | Choi et al. |
| 2010/0163811 A1 | 7/2010 | Oh et al. |
| 2010/0227178 A1 | 9/2010 | Oouchi et al. |
| 2011/0151195 A1* | 6/2011 | Mitsukura et al. ............ 428/156 |
| 2011/0151379 A1 | 6/2011 | Choi et al. |
| 2012/0091407 A1 | 4/2012 | Lee et al. |
| 2012/0145971 A1 | 6/2012 | Lee et al. |
| 2012/0161088 A1 | 6/2012 | Choi et al. |
| 2012/0196980 A1 | 8/2012 | Kliesch et al. |
| 2013/0126217 A1 | 5/2013 | Yamaguchi et al. |

FOREIGN PATENT DOCUMENTS

| | | |
|---|---|---|
| CN | 101452208 A | 6/2009 |
| CN | 101598897 A | 12/2009 |
| CN | 101806999 A | 8/2010 |
| EP | 0725315 A2 | 8/1996 |
| EP | 1471112 A1 | 10/2004 |
| EP | 1898267 A1 | 3/2008 |
| EP | 1791824 B1 | 8/2009 |
| EP | 2482338 A2 | 8/2012 |
| EP | 2696236 A1 | 2/2014 |
| JP | 60237403 | 11/1985 |
| JP | 1152449 | 6/1989 |
| JP | 1200353 | 8/1989 |
| JP | 03-058002 | 3/1991 |
| JP | 03-172354 | 7/1991 |
| JP | 4007373 | 1/1992 |
| JP | 4091173 | 3/1992 |
| JP | 4163552 | 6/1992 |
| JP | 05-339356 A | 12/1993 |
| JP | 06-001938 A | 1/1994 |
| JP | 06-041458 | 2/1994 |
| JP | 06-067467 A | 3/1994 |
| JP | 07-064281 A | 3/1995 |
| JP | 07-64282 | 3/1995 |
| JP | 3287661 B2 | 3/1995 |
| JP | 07-140654 | 6/1995 |
| JP | 07-140654 A | 6/1995 |
| JP | 7-172032 | 7/1995 |
| JP | 08-278630 A | 10/1996 |
| JP | 09-015852 A | 1/1997 |
| JP | 09-022653 A | 1/1997 |
| JP | 09-291224 | 11/1997 |
| JP | 09-304929 | 11/1997 |
| JP | 10-010311 A | 1/1998 |
| JP | 10-0107018 | 1/1998 |
| JP | 10-067970 | 3/1998 |
| JP | 10-123316 | 5/1998 |
| JP | 10-204321 A | 8/1998 |
| JP | 10-221848 A | 8/1998 |
| JP | 10218973 A | 8/1998 |
| JP | 10-253820 A | 9/1998 |
| JP | 10-254133 | 9/1998 |
| JP | 10-254133 A | 9/1998 |
| JP | 10-510861 | 10/1998 |
| JP | 11-060989 A | 3/1999 |
| JP | 11231523 A | 8/1999 |
| JP | 2000-056120 | 2/2000 |
| JP | 2000-171969 A | 6/2000 |
| JP | 2001-131241 | 5/2001 |
| JP | 2002-014222 A | 1/2002 |
| JP | 2002-145999 | 5/2002 |
| JP | 2002-285007 | 10/2002 |
| JP | 2003-066597 | 3/2003 |
| JP | 2003-149810 | 5/2003 |
| JP | 2004-004762 A | 1/2004 |
| JP | 2004-029745 A | 1/2004 |
| JP | 2004-107354 A | 4/2004 |
| JP | 2004-186227 | 7/2004 |
| JP | 2004-198717 A | 7/2004 |
| JP | 2004-251946 A | 9/2004 |
| JP | 2004-292672 A | 10/2004 |
| JP | 2004-075985 A | 11/2004 |
| JP | 2004-341121 | 12/2004 |
| JP | 2005-215149 | 8/2005 |
| JP | 2006-133508 A | 5/2006 |
| JP | 2006-241217 A | 9/2006 |
| JP | 3909807 B2 | 4/2007 |
| JP | 2007-217531 A | 8/2007 |
| JP | 4004826 B2 | 11/2007 |
| JP | 2007-322485 A | 12/2007 |
| JP | 2008-106130 A | 5/2008 |
| JP | 5046678 A | 9/2008 |
| JP | 2008-304583 | 12/2008 |
| JP | 2009-122224 A | 6/2009 |
| JP | 2009-162802 A | 7/2009 |
| JP | 2009-167245 A | 7/2009 |
| JP | 2009-265527 A | 11/2009 |
| JP | 4383007 B2 | 12/2009 |
| JP | 2010-024434 A | 2/2010 |
| JP | 2010-066676 A | 3/2010 |
| JP | 2010-128320 A | 6/2010 |
| JP | 2010-211198 | 9/2010 |
| JP | 2011-075691 A | 4/2011 |
| JP | 4756963 B2 | 8/2011 |
| JP | 2011-197670 A | 10/2011 |
| JP | 2012-027089 A | 2/2012 |
| JP | 2012-093438 A | 5/2012 |
| JP | 5033430 B2 | 9/2012 |
| JP | 5034616 B2 | 9/2012 |
| JP | 2012-233048 A | 11/2012 |
| JP | 5096814 B2 | 12/2012 |
| JP | 2013-003310 A | 1/2013 |
| JP | 5117714 B2 | 1/2013 |
| JP | 2013-054393 A | 3/2013 |
| JP | 5188391 B2 | 4/2013 |
| JP | 2013-080206 A | 5/2013 |
| JP | 2013-134263 A | 7/2013 |
| KR | 1019910004717 | 7/1991 |
| KR | 1019920005780 | 7/1992 |
| KR | 10-1992-7002502 | 9/1992 |
| KR | 1992-7002502 | 9/1992 |
| KR | 10-1993-7000858 | 3/1993 |
| KR | 1993-7000858 | 3/1993 |
| KR | 10-1994-0005617 A1 | 6/1994 |
| KR | 1994-0005617 | 6/1994 |
| KR | 10-1994-0007778 | 8/1994 |
| KR | 10-1995-7000359 | 1/1995 |
| KR | 1995-7000359 | 1/1995 |
| KR | 10-1995-7002313 | 6/1995 |
| KR | 10-1995-0011163 A1 | 9/1995 |
| KR | 10-1995-7003746 | 9/1995 |
| KR | 1995-0011163 | 9/1995 |
| KR | 1995-7003746 | 9/1995 |
| KR | 1996-0029904 | 8/1996 |
| KR | 10-1997-0007487 A | 2/1997 |
| KR | 1999-0007097 | 1/1999 |
| KR | 10-1996-0011513 | 9/1999 |
| KR | 10-1999-0072717 A | 9/1999 |
| KR | 10-1993-700858 | 7/2000 |
| KR | 10-0264691 | 9/2000 |
| KR | 10-1995-700359 | 1/2001 |
| KR | 10-2001-0095243 | 11/2001 |
| KR | 10-2002-0015650 A | 2/2002 |
| KR | 10-1992-702502 | 12/2002 |
| KR | 10-2003-057090 | 7/2003 |
| KR | 10-0635834 A | 12/2003 |
| KR | 10-1996-0029904 | 5/2004 |
| KR | 10-1996-0029904 A1 | 5/2004 |
| KR | 10-2004-0097192 A | 11/2004 |
| KR | 10-2005-0020653 A | 3/2005 |
| KR | 10-2005-0028883 A | 3/2005 |
| KR | 2005-0094163 A | 9/2005 |
| KR | 10-2006-0041154 A | 5/2006 |
| KR | 2006-0052171 | 5/2006 |
| KR | 2006-70772 A | 6/2006 |
| KR | 10-2006-0076412 A | 7/2006 |

(56) References Cited

FOREIGN PATENT DOCUMENTS

| KR | 10-2007-0042205 A | 4/2007 |
|---|---|---|
| KR | 10-0725023 B1 | 5/2007 |
| KR | 10-0787715 A | 7/2007 |
| KR | 10-0750331 B1 | 8/2007 |
| KR | 10-2008-0077435 A | 8/2008 |
| KR | 10-2008-0107298 A | 12/2008 |
| KR | 10-1036784 A | 12/2008 |
| KR | 10-1117997 A | 1/2009 |
| KR | 10-2009-0026037 A | 3/2009 |
| KR | 10-1002734 A | 3/2009 |
| KR | 10-2009-0049541 A | 5/2009 |
| KR | 10-2009-0059319 A | 6/2009 |
| KR | 10-2009-0062898 A | 6/2009 |
| KR | 10-2009-0064316 A | 6/2009 |
| KR | 10-2009-0066242 A | 6/2009 |
| KR | 2009-0061878 A | 6/2009 |
| KR | 2009-0066076 A | 6/2009 |
| KR | 2009-0074432 A | 7/2009 |
| KR | 10-2009-0106226 A | 10/2009 |
| KR | 10-2010-0016089 A | 2/2010 |
| KR | 10-2010-0026386 A | 3/2010 |
| KR | 10-2010-0047648 A | 5/2010 |
| KR | 10-2010-0053090 A | 5/2010 |
| KR | 10-2010-0053476 A | 5/2010 |
| KR | 10-2010-0066197 | 6/2010 |
| KR | 2010-0068514 A | 6/2010 |
| KR | 10-2010-0072934 A | 7/2010 |
| KR | 10-2010-0078845 A | 7/2010 |
| KR | 10-2010-0080142 A | 7/2010 |
| KR | 10-2010-0080318 A | 7/2010 |
| KR | 10-2010-0089589 A | 8/2010 |
| KR | 10-2010-0128707 A | 12/2010 |
| KR | 10-2011-0035940 A | 4/2011 |
| KR | 10-2011-0069468 A | 6/2011 |
| KR | 10-1068622 A | 6/2011 |
| KR | 2011-0073372 A | 6/2011 |
| KR | 10-2012-0043416 A | 5/2012 |
| KR | 10-2012-0045077 A | 5/2012 |
| KR | 10-2012-0078495 | 7/2012 |
| KR | 10-1167011 B1 | 7/2012 |
| KR | 10-2012-0089914 A | 8/2012 |
| KR | 10-2012-0105571 A | 9/2012 |
| KR | 10-2013-0003892 A | 1/2013 |
| KR | 10-2013-0016043 A | 2/2013 |
| KR | 10-2013-0021139 A | 3/2013 |
| KR | 10-2013-0032831 A | 4/2013 |
| KR | 10-2013-0039949 A | 4/2013 |
| KR | 10-2013-0060035 A | 6/2013 |
| KR | 10-2013-0079165 A | 7/2013 |
| KR | 10-1296851 B1 | 8/2013 |
| TW | 200540565 | 12/2005 |
| TW | 200937116 | 9/2009 |
| TW | 2010-16815 | 5/2010 |
| WO | 91/20006 | 12/1991 |
| WO | 92/14172 | 8/1992 |
| WO | 94/14892 | 7/1994 |
| WO | 95/02839 | 1/1995 |
| WO | 2004/055597 A1 | 7/2004 |
| WO | 2006/044676 A2 | 4/2006 |
| WO | 2007/129589 A1 | 11/2007 |
| WO | 2008047992 A1 | 4/2008 |
| WO | 2010/050650 A | 5/2010 |
| WO | 2011/132408 A1 | 10/2011 |
| WO | 2012/091224 A1 | 7/2012 |
| WO | 2012/091401 A2 | 7/2012 |
| WO | 2012/145330 A1 | 10/2012 |
| WO | 2013/018978 A1 | 2/2013 |
| WO | 2013/115164 A1 | 8/2013 |

OTHER PUBLICATIONS

Office Action in commonly owned U.S. Appl. No. 13/589,529 mailed Dec. 27, 2013, pp. 1-8.
Notice of Allowance in commonly owned U.S. Appl. No. 13/589,529 mailed Apr. 28, 2014, pp. 1-7.
Office Action in commonly owned U.S. Appl. No. 13/929,056 mailed Nov. 7, 2013, pp. 1-11.
Final Office Action in commonly owned U.S. Appl. No. 13/929,056 mailed Mar. 5, 2014, pp. 1-13.
Advisory Action in commonly owned U.S. Appl. No. 13/929,056 mailed May 8, 2014, pp. 1-4.
Office Action in commonly owned U.S. Appl. No. 13/929,056 mailed Jul. 8, 2014, pp. 1-23.
Notice of Allowance in commonly owned U.S. Appl. No. 13/929,056 mailed Oct. 15, 2014, pp. 1-9.
Final Office Action in commonly owned U.S. Appl. No. 13/929,056 mailed Nov. 25, 2013, pp. 1-8.
Advisory Action in commonly owned U.S. Appl. No. 13/929,056 mailed Feb. 4, 2014, pp. 1-3.
Computer-generated translation of KR 10-2012-0043416 (May 2012), pp. 1-20.
Office Action in commonly owned U.S. Appl. No. 12/504,409 mailed on Nov. 18, 2010, pp. 1-12.
English translation of Taiwanese Search Report in commonly owned Taiwanese Application No. 095144145 dated May 11, 2010, pp. 1.
Office Action in commonly owned U.S. Appl. No. 12/323,554 mailed Dec. 29, 2009, pp. 1-18.
Office Action in commonly owned U.S. Appl. No. 13/161,542 mailed Jan. 6, 2012, pp. 1-14.
Office Action in commonly owned U.S. Appl. No. 13/241,434 mailed Jan. 23, 2012, pp. 1-19.
Office Action in commonly owned U.S. Appl. No. 11/747,313 mailed on Dec. 22, 2010, pp. 1-4.
Search Report in commonly owned Taiwanese Application No. 101127768 dated Feb. 24, 2014, pp. 1.
English-translation of Search Report in commonly owned Taiwanese Application No. 101127768 dated Feb. 24, 2014, pp. 1.
Office Action in commonly owned U.S. Appl. No. 11/473,876, mailed on Dec. 18, 2008, pp. 1-14.
Notice of Allowance in commonly owned U.S. Appl. No. 11/473,876, mailed on Jul. 17, 2009, pp. 1-6.
International Search Report in commonly owned International Application No. PCT/KR2007/002908, dated Sep. 21, 2007, pp. 1-2.
English Translation of Abstract for Korean Patent Application No. 92-702502.
English Translation of Abstract for Korean Patent Application No. 93-700858.
English Translation of Abstract for Korean Patent Application No. 94-7778.
English Translation of Abstract for Korean Patent Application No. 95-11163.
English Translation of Abstract for Korean Patent Application No. 95-700359.
English Translation of Abstract for Korean Patent Application No. 95-703746.
English Translation of Abstract for Korean Patent Application No. 96-11513.
English Translation of Abstract for Korean Patent Application No. 96-29904.
Machine Translation of JP 07064282 A, pp. 1-23.
Office Action in commonly owned copending U.S. Appl. No. 12/323,544, mailed on Jun. 24, 2009, pp. 1-25.
English abstract of JP 2004-292672, published Oct. 21, 2004, pp. 1-3.
English abstract of JP 10-204321, published Aug. 4, 1998, pp. 1-3.
English abstract of JP 2004-251946, published Sep. 9, 2004, pp. 1-4.
English abstract of JP 2004-029745, published Jan. 29, 2004, pp. 1-4.
English abstract of JP 2004-004762, published Jan. 8, 2004, pp. 1-4.
English abstract of JP 2004-075985, published Mar. 11, 2004, pp. 1-5.
English abstract of JP 2004-198717, published Jul. 15, 2004, pp. 1-6.
English abstract of JP 10-253820, published Sep. 25, 1998, pp. 1-3.
English abstract of JP 10-010311, published Jan. 16, 1998, pp. 1-3.
English abstract of JP 11-060989, published Mar. 5, 1999, pp. 1-2.
English abstract of JP 09-022653, published Jan. 21, 1997, pp. 1-2.
Office Action in commonly owned U.S. Appl. No. 11/747,313 mailed Jun. 13, 2011, pp. 1-6.
Office Action in commonly owned U.S. Appl. No. 11/747,313 mailed Nov. 23, 2011, pp. 1-6.

(56) References Cited

OTHER PUBLICATIONS

Office Action in commonly owned U.S. Appl. No. 14/244,175 mailed Jan. 13, 2015, pp. 1-24.
cis-1,2,3,5-Tetrahydrophthalic anhydride 95% Sigma-Aldrich from 1 printed Jan. 10, 2015 from http://www.sigmaalddrich.com/catalog/product website online, 2 pages.
Office Action in commonly owned U.S. Appl. No. 14/279,402 mailed Dec. 29, 2014, pp. 1-8.
Office Action in commonly owned U.S. Appl. No. 13/197,194 mailed May 16, 2013, pp. 1-9.
Machine Translation of KR 2003057090 A, pp. 1-14.

* cited by examiner

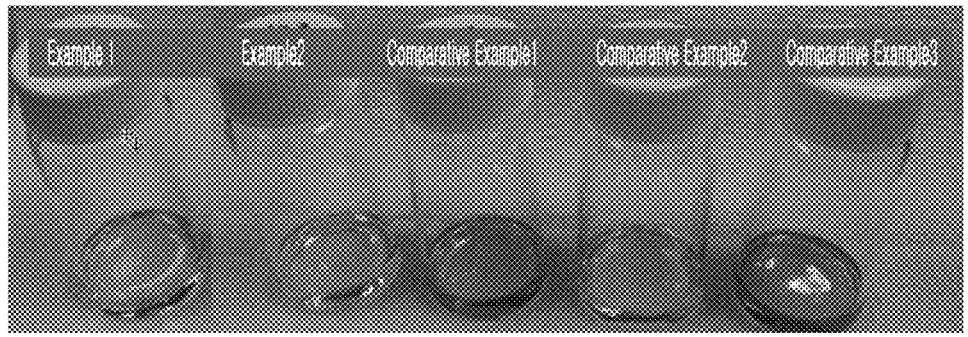

PHOTOSENSITIVE RESIN COMPOSITION AND BLACK SPACER USING THE SAME

CROSS-REFERENCE TO RELATED APPLICATIONS

This application claims priority to and the benefit of Korean Patent Application No. 10-2012-0144737 filed in the Korean Intellectual Property Office on Dec. 12, 2012, the entire disclosure of which is incorporated herein by reference.

FIELD

This disclosure relates to a photosensitive resin composition and a black spacer using the same.

BACKGROUND

A photosensitive resin composition is a material used to manufacture a display device such as a color filter, a liquid crystal display material, an organic light emitting diode (EL), a display panel material, and the like. For example, a color filter such as a color liquid crystal display and the like needs a light-blocking layer among color layers such as red, green, blue, and the like to increase display contrast or chromophore effect. The light-blocking layer may be mainly formed of a photosensitive resin composition.

Recently, an attempt to use a light-blocking layer as a black spacer (or a black photo spacer) supporting between two TFT and C/F substrates interposed by liquid crystal layers has been made. In particular, the black spacer may require chemical resistance in a solvent of polyimide of an upper layer and a solution for rework as well as realize a pattern step difference by adjusting an exposure dose with a half tone mask, in addition to mention basic characteristics such as compression displacement, an elasticity recovery rate, breaking strength, and the like.

SUMMARY

One embodiment provides a photosensitive resin composition that can have excellent reliability, heat resistance, and/or chemical resistance as well as excellent forming capability of a film step difference and storage.

Another embodiment provides a black spacer manufactured using the photosensitive resin composition.

One embodiment provides a photosensitive resin composition that includes (A) a thermally curing initiator having a half-life of about one hour at a temperature ranging from about 100 to about 150° C.; (B) a photopolymerization initiator; (C) a binder resin; (D) a photopolymerizable compound; (E) a colorant; and (F) a solvent.

The thermally curing initiator (A) may have a half-life of about one hour at a temperature ranging from about 100 to about 120° C.

The thermally curing initiator (A) may be included in an amount of about 0.1 to about 10.0 wt % based on the total amount (total weight) of a solid in the photosensitive resin composition.

The binder resin (C) may include a cardo-based resin, an acrylic-based resin, or a combination thereof.

The photosensitive resin composition may include about 0.01 to about 3.0 wt % of (A) the thermally curing initiator; about 0.05 to about 10.0 wt % of (B) the photopolymerization initiator; about 1 to about 20 wt % (C) the binder resin; about 1 to about 20 wt % of (D) the photopolymerizable compound; about 1 to about 40 wt % (E) the colorant; and a balance amount of (F) the solvent.

The pigment may include an organic pigment, an inorganic pigment, or a combination thereof. The organic pigment may include a black organic pigment, and the inorganic pigment may include carbon black, chromium oxide, iron oxide, titan black, titanium carbide, aniline black or a combination thereof.

Another embodiment provides a black spacer manufactured using the photosensitive resin composition.

Other embodiments are included in the following detailed description.

The photosensitive resin composition may realize excellent black spacer having excellent reliability, heat resistance, and/or chemical resistance as well as excellent forming capability of a film step difference and storage.

BRIEF DESCRIPTION OF THE DRAWING

FIG. 1 is a photograph showing elution evaluation results of black spacers according to Examples 1 and 2 and Comparative Examples 1 to 3.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" refers to one substituted with a substituent including halogen (F, Cl, Br or I), a hydroxyl group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

As used herein, when a specific definition is not otherwise provided, the term "hetero" may refer to one substituted with at least one hetero atom including N, O, S P, or a combination thereof, instead of at least one C in a cyclic substituent.

As used herein, when a specific definition is not otherwise provided, "(meth)acrylate" refers to both "acrylate" and "methacrylate", and "(meth)acrylic acid" refers to "acrylic acid" and "methacrylic acid".

A photosensitive resin composition according to one embodiment includes (A) a thermally curing initiator, (B) a photopolymerization initiator, (C) a binder resin, (D) a photopolymerizable compound, (E) a colorant and (F) a solvent.

Hereinafter, each component is described in detail.

(A) Thermally Curing Initiator

A black spacer has a structure of combining a light-blocking layer with a column spacer and may be obtained through one pattern-forming process. Accordingly, the black spacer is formed to have a film thickness difference between a light-blocking layer pattern and a column spacer pattern, that is, a film step difference and thus, high optical density.

When a pattern for the black spacer is formed, curing efficiency may be increased by increasing photo sensitivity to increase reliability and chemical resistance, but a film step difference may be hardly formed by adjusting an exposure dose transmitting a half tone part of a mask. In addition, the pattern may be deformed, since the film step difference decreases during the post treatment for additional curing after exposure and development.

According to one embodiment, the thermally curing initiator may be included in a photosensitive resin composition, so that the photosensitive resin composition may be cured during the post treatment (post-bake). Accordingly, when the photosensitive resin composition according to one embodiment is used, reliability, chemical resistance, and/or heat resistance may be obtained, and simultaneously, a film step difference can be formed and the formed film step difference itself may be maintained after the post-bake.

The thermally curing initiator according to one embodiment can have selective reactivity, that is, can be cured during the post-bake but not cured during the pre-bake, drying process to remove a solvent after coating the photosensitive resin composition on a substrate.

Specifically, the thermally curing initiator has 1 hour half-life at a temperature ranging about 100 to about 150° C., for example, at a temperature ranging about 100 to about 120° C. The half-life indicates how long it takes for a particular reaction material to decrease down to a half of the original number. Specifically, a thermally curing initiator takes one hour for a reaction group to decrease down to a half of an original number at a temperature ranging from about 100 to about 150° C. when the reaction group initiating a reaction among initiator molecules is stored. Since the thermally curing initiator having the temperature range has selective reactivity of not curing during pre-bake but cured during post-bake, the photosensitive resin composition may obtain excellent reliability, heat resistance and/or chemical resistance and simultaneously, form a film step difference and maintain the film step difference after the post-bake.

Examples of the thermally curing initiator may include without limitation di-t-butyl peroxy hexahydroterephthalate, 2,2-bis(t-butylperoxy)butane, 1,1-bis(t-butylperoxy cyclohexane), n-butyl 4,4-bis(t-butylperoxy)valerate, 2,2-bis(4,4-di-t-butylperoxy cyclohexyl)propane, t-butyl cumyl peroxide, di-t-butyl peroxide, α,α'-bis(t-butylperoxy)diisopropyl benzene, dicumyl peroxide, 2,5-dimethyl-2,5-bis(t-butylperoxy)hexane, t-butyl peroxyacetate, t-butyl peroxy 2-ethylhexyl monocarbonate, t-butyl peroxy isopropyl monocarbonate, t-butyl peroxymaleic acid, t-butyl peroxybenzoate, t-butyl peroxy 3,5,5-trimethyl hexanoate, 2,5-dimethyl-2,5-bis(m-toluoylperoxy)hexane, t-amyl peroxy 2-ethylhexyl monocarbonate, and the like, and combinations thereof.

The photosensitive resin composition may include the thermally curing initiator in an amount of about 0.1 to about 10.0 wt %, for example about 0.5 to about 10.0 wt %, and as another example about 1.0 to about 4.0 wt %, based on the total amount (total weight) of a solid of the photosensitive resin composition. The amount range is based on the total amount of a solid except for the solvent in the photosensitive resin composition. In some embodiments, the photosensitive resin composition may include the thermally curing initiator in an amount of about 0.1, 0.2, 0.3, 0.4, 0.5, 0.6, 0.7, 0.8, 0.9, 1, 2, 3, 4, 5, 6, 7, 8, 9, or 10 wt %, based on the total amount (total weight) of a solid of the photosensitive resin composition. Further, according to some embodiments of the present invention, the amount of the solid of the thermally curing initiator can be in a range from about any of the foregoing amounts to about any other of the foregoing amounts.

When the amount of the solid of the thermally curing initiator is included within the above range, a black spacer having excellent reliability, heat resistance and/or chemical resistance as well as excellent formation and maintenance capability of a film step difference may be realized.

The photosensitive resin composition may include the thermally curing initiator in an amount of about 0.01 to about 3.0 wt %, for example 0.1 to 2.0 wt %, based on total amount (total weight) of the photosensitive resin composition. In some embodiments, the photosensitive resin composition may include the thermally curing initiator in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, or 3 wt %, based on total amount (total weight) of the photosensitive resin composition. Further, according to some embodiments of the present invention, the amount of the thermally curing initiator can be in a range from about any of the foregoing amounts to about any other of the foregoing amounts.

When the thermally curing initiator is included in an amount within the above range, a black spacer having excellent reliability, heat resistance and/or chemical resistance as well as excellent formation and maintenance capability of a film step difference may be realized.

(B) Photopolymerization Initiator

The photopolymerization initiator produces a radical at exposure and causes photopolymerization during a pattern-forming process in the photosensitive resin composition.

Examples of the photopolymerization initiator may include without limitation acetophenone-based compounds, benzophenone-based compounds, thioxanthone-based compounds, benzoin-based compounds, triazine-based compounds, oxime-based compounds, and the like, and combinations thereof.

Examples of the acetophenone-based compound may include without limitation 2,2'-diethoxy acetophenone, 2,2'-dibutoxy acetophenone, 2-hydroxy-2-methylpropiophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like, and combinations thereof.

Examples of the benzophenone-based compound may include without limitation benzophenone, benzoyl benzoic acid, benzoyl benzoic acid methyl ester, 4-phenyl benzophenone, hydroxy benzophenone, acrylated benzophenone, 4,4'-bis(dimethyl amino)benzophenone, 4,4'-bis(diethylamino) benzophenone, 4,4'-dimethylaminobenzophenone, 4,4'-dichlorobenzophenone, 3,3'-dimethyl-2-methoxybenzophenone, and the like, and combinations thereof.

Examples of the thioxanthone-based compound may include without limitation thioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Examples of the benzoin-based compound may include without limitation benzoin, benzoin methyl ether, benzoin ethyl ether, benzoin isopropyl ether, benzoin isobutyl ether, benzyldimethyl ketal, and the like, and combinations thereof.

Examples of the triazine-based compound may include without limitation 2,4,6-trichloro-s-triazine, 2-phenyl 4,6-bis (trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6- bis(trichloromethyl)-s-triazine, 2-(p-tolyl)-4,6-bis(trichloromethyl)-s-triazine, 2-biphenyl 4,6-bis(trichloro methyl)-s-triazine, bis(trichloromethyl)-6-styryl-s-triazine, 2-(naphtho1-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like, and combinations thereof.

Examples of the oxime-based compound may include without limitation 2-(o-benzoyloxime)-1-[4-(phenylthio)phenyl]-1,2-octandione, 1-(o-acetyloxime)-1-[9-ethyl-6-(2-methylbenzoyl)-9H-carbazol-3-yl]ethanone, and the like, and combinations thereof.

Other examples of the photopolymerization initiator may further include without limitation carbazole-based compounds, diketone-based compounds, sulfonium borate-based compounds, diazo-based compounds, imidazole-based compounds, biimidazole-based compounds, and the like, and combinations thereof.

The photosensitive resin composition may include the photopolymerization initiator in an amount of about 0.05 to about 10.0 wt %, for example about 1.0 to about 4.0 wt %, based on the total amount (total weight) of the photosensitive resin composition. In some embodiments, the photosensitive resin composition may include the photopolymerization initiator in an amount of about 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 wt %, based on total amount (total weight) of the photosensitive resin composition. Further, according to some embodiments of the present invention, the amount of the photopolymerization initiator can be in a range from about any of the foregoing amounts to about any other of the foregoing amounts.

When the photopolymerization initiator is included in an amount within the above range, sufficient photopolymerization can be performed at exposure during pattern forming process, and decrease of transmittance due to non-reacting initiators may be prohibited.

(C) Binder Resin

The binder resin may provide the photosensitive resin composition with close-contacting (adhesive) force, developability, and the like.

Examples of the binder resin may include without limitation cardo-based resins, acrylic-based resins, polyimide-based resins, polyurethane-based resins, and the like, and combinations thereof. When a cardo-based resin, acrylic-based resin, or a mixture thereof is used, heat resistance, chemical resistance, and/or close contacting properties of the photosensitive resin composition may be improved.

The cardo-based resin may be a compound including a repeating unit represented by the following Chemical Formula 1.

[Chemical Formula 1]

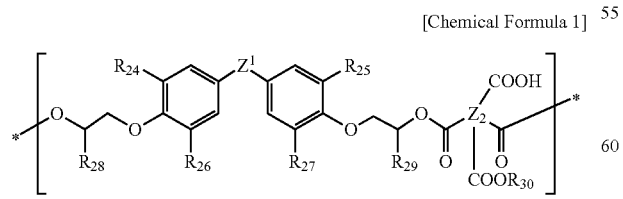

In the above Chemical Formula 1, $R_{24}$ to $R_{27}$ are the same or different and are each independently hydrogen, halogen, or substituted or unsubstituted C1 to C20 alkyl, $R_{28}$ and $R_{29}$ are the same or different and are each independently hydrogen or $-CH_2OR_a$ (wherein $R_a$ is a vinyl group, an acrylate group or a methacrylate group), each $R_{30}$ is the same or different and each is independently hydrogen, substituted or unsubstituted C1 to C20 alkyl, substituted or unsubstituted C2 to C20 alkenyl, an acrylate group or a methacrylate group, each $Z_1$ is the same or different and each is independently a single bond, $-O-$, $-CO-$, $-SO_2-$, $-CR_bR_c-$, $-SiR_dR_e-$ (wherein $R_b$ to $R_e$ are the same or different and are each independently hydrogen or substituted or unsubstituted C1 to C20 alkyl), or a linking group selected from the following Chemical Formulae 2 to 12, and each $Z_2$ is the same or different and is each independently an acid dianhydride residual group.

[Chemical Formula 2]

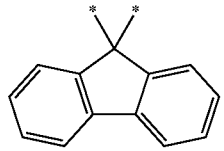

[Chemical Formula 3]

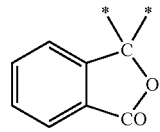

[Chemical Formula 4]

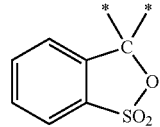

[Chemical Formula 5]

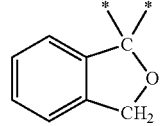

[Chemical Formula 6]

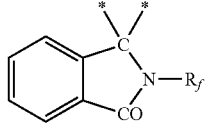

In the above Chemical Formula 6, $R_f$ is hydrogen, ethyl, $-C_2H_4Cl$, $-C_2H_4OH$, $-CH_2CH=CH_2$, or phenyl)

[Chemical Formula 7]

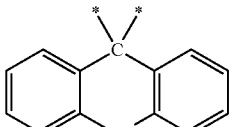

[Chemical Formula 8]

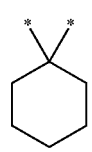

[Chemical Formula 9]

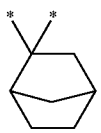

[Chemical Formula 10]

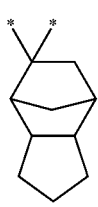

[Chemical Formula 11]

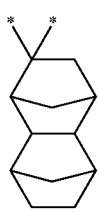

[Chemical Formula 12]

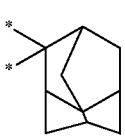

The cardo-based resin may be obtained by reacting a compound represented by the following Chemical Formula 13 and tetracarboxylic acid dianhydride.

[Chemical Formula 13]

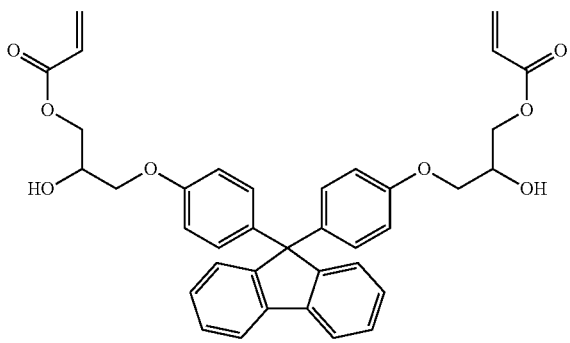

The tetracarboxylic acid dianhydride may be an aromatic tetracarboxylic acid dianhydride. Examples of the aromatic tetracarboxylic acid dianhydride may include without limitation pyromellitic acid dianhydride, 3,3',4,4'-biphenyltetracarboxylic acid dianhydride, 2,3,3',4-biphenyltetracarboxylic acid dianhydride, 2,2',3,3'-biphenyltetracarboxylic acid dianhydride, 3,3',4,4'-benzophenonetetracarboxylic acid dianhydride, 3,3',4,4'-biphenylethertetracarboxylic acid dianhydride, 3,3',4,4'-diphenylsulfonetetracarboxylic acid dianhydride, 1,2,3,4-cyclopentanetetracarboxylic acid dianhydride, 1,2,5,6-naphthalenetetracarboxylic acid dianhydride, 2,3,6,7-naphthalenetetracarboxylic acid dianhydride, 1,4,5,8-naphthalenetetracarboxylic acid dianhydride, 2,3,5,6-pyridinetetracarboxylic acid dianhydride, 3,4,9,10-perylenetetracarboxylic acid dianhydride, 2,2-bis(3,4-dicarboxylphenyl)hexafluoropropane dianhydride, and the like, and combinations thereof.

The cardo-based resin may have a weight average molecular weight of about 1,000 to about 20,000 g/mol, for example about 3,000 to about 10,000 g/mol. When the cardo-based resin has a weight average molecular weight within the above range, excellent patterning properties and/or developability may be obtained during manufactures of a light-blocking layer, a column spacer, and/or a black spacer.

The acrylic-based resin is a copolymer of a first ethylenic unsaturated monomer and a second ethylenic unsaturated monomer that is copolymerizable with the first ethylenic unsaturated monomer, and is a resin including at least one acrylic-based repeating unit.

The first ethylenic unsaturated monomer is an ethylenic unsaturated monomer including at least one carboxyl group. Examples of the monomer include without limitation acrylic acid, methacrylic acid, maleic acid, itaconic acid, fumaric acid, and the like, and combinations thereof.

The acrylic-based resin may include the first ethylenic unsaturated monomer in an amount ranging from about 5 to about 50 wt %, for example, from about 10 to about 40 wt %, based on the total amount (total weight) of the acrylic-based resin.

Examples of the second ethylenic unsaturated monomer may include without limitation aromatic vinyl compounds such as styrene, α-methylstyrene, vinyltoluene, vinylbenzylmethylether, and the like; unsaturated carboxylic acid ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid amino alkyl ester compounds such as 2-aminoethyl(meth)acrylate, 2-dimethylaminoethyl (meth)acrylate, and the like; carboxylic acid vinyl ester compounds such as vinyl acetate, vinyl benzoate, and the like; unsaturated carboxylic acid glycidyl ester compounds such as glycidyl(meth)acrylate and the like; vinyl cyanide compounds such as (meth)acrylonitrile and the like; unsaturated amide compound such as (meth)acrylamides and the like; and the like. They may be used singularly or as a mixture of more than two.

Specific examples of the acrylic-based resin may include without limitation a methacrylic acid/benzylmethacrylate/styrene copolymer, a methacrylic acid/benzylmethacrylate/2-hydroxyethylmethacrylate copolymer, a methacrylic acid/benzylmethacrylate/styrene/2-hydroxyethylmethacrylate copolymer, and the like, but are not limited thereto. They may be used singularly or as a mixture of two or more.

The acrylic-based resin may have a weight average molecular weight ranging from about 3,000 to about 150,000 g/mol, for example, about 5,000 to about 50,000 g/mol, and as another example about 2,000 to about 30,000 g/mol. When the acrylic-based resin has a weight average molecular weight within the above range, the photosensitive resin composition can have good physical and chemical properties, appropriate viscosity, and/or close-contacting properties with a substrate during manufactures of a light-blocking layer, a column spacer, and/or a black spacer.

The acrylic-based resin may have an acid value ranging from about 15 to about 150 mgKOH/g, for example about 80 to about 130 mgKOH/g. When acrylic-based resin has an acid value within the above range, excellent resolution of a pixel pattern may be realized.

The binder resin may have a weight average molecular weight of about 1,000 to about 150,000 g/mol.

The photosensitive resin composition may include the binder resin in an amount of about 1 to about 20 wt %, for example about 1 to about 10 wt %, based on the total amount (total weight) of the photosensitive resin composition. In some embodiments, the photosensitive resin composition may include the binder resin in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the binder resin can be in a range from about any of the foregoing amounts to about any other of the foregoing amounts.

When the binder resin is included in an amount within the above range, a viscosity may be maintained appropriately and excellent pattern, processibility, and developability may be obtained during manufactures of a light-blocking layer, a column spacer, or a black spacer.

(D) Photopolymerizable Compound

The photopolymerizable compound is a compound to be photopolymerized by the above-described photopolymerization initiator.

The photopolymerizable compound may be monofunctional and/or multi-functional ester of (meth)acrylic acid having at least one ethylenic unsaturated double bond.

The photopolymerizable compound can cause sufficient polymerization at exposure during pattern forming processes to form patterns having excellent heat resistance, light resistance, and/or chemical resistance, due to the ethylenic unsaturated double bond.

Examples of the photopolymerizable compound may include without limitation ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenolA di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenolA epoxy(meth)acrylate, ethylene glycol monomethylether (meth)acrylate, trimethylol propane tri(meth)acrylate, tris(meth)acryloyloxyethyl phosphate, novolacepoxy (meth)acrylate, and the like, and combinations thereof.

Commercially available examples of the photopolymerizable compound are as follows. The mono-functional (meth) acrylic acid ester may include without limitation Aronix M-101®, M-111®, M-114® (TOAGOSEI CHEMICAL INDUSTRY CO., LTD.); KAYARAD TC-110S®, TC-120S® (NIPPON KAYAKU CO., LTD.); V-158®, V-2311® (OSAKA ORGANIC CHEMICAL IND., LTD.), and the like. Examples of a difunctional (meth)acrylic acid ester may include without limitation Aronix M-210®, M-240®, M-6200® (TOAGOSEI CHEMICAL INDUSTRY CO., LTD.), KAYARAD HDDA®, HX-220®, R-604® (NIPPON KAYAKU CO., LTD.), V-260®, V-312®, V-335 HP® (OSAKA ORGANIC CHEMICAL IND., LTD.), and the like. Examples of a tri-functional (meth)acrylic acid ester may include without limitation Aronix M-309®, M-400®, M-405®, M-450®, M-7100®, M-8030®, M-8060® (TOAGOSEI CHEMICAL INDUSTRY CO., LTD.), KAYARAD TMPTA®, DPCA-20®, DPCA-30®, DPCA-60®, DPCA-120® (NIPPON KAYAKU CO., LTD.), V-295®, V-300®, V-360®, V-GPT®, V-3PA®, V-400® (Osaka Yuki Kayaku Kogyo Co. Ltd.), and the like. The commercially available products may be used singularly or as a mixture of two or more kinds.

The photopolymerizable compound may be treated with acid anhydride to improve developability.

The photosensitive resin composition may include the photopolymerizable compound in an amount ranging from about 1 to about 20 wt %, for example about 1 to about 10 wt %, based on the total amount (total weight) of the photosensitive resin composition. In some embodiments, the photosensitive resin composition may include the photopolymerizable compound in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the photopolymerizable compound can be in a range from about any of the foregoing amounts to about any other of the foregoing amounts.

When the photopolymerizable compound is included in an amount within the above range, curing at exposure during pattern forming processes can be sufficiently performed, and the photopolymerizable monomer can have good sensitivity under oxygen, and compatibility with the binder resin.

(E) Colorant

The colorant may include pigment, dye, or a combination thereof.

The pigment may include an organic pigment, an inorganic pigment, or a combination thereof. In order to realize high optical density, the organic pigment and the inorganic pigment may be mixed.

The organic pigment may be a black organic pigment. The black organic pigment can have insulation properties.

Examples of the black organic pigment may include without limitation perylene black, cyanine black, and the like, which may be used singularly or in a mixture of two or more.

The black organic pigment may be a mixture of two or more kinds of organic pigments to show black. The black organic pigment may be any combination of pigments that may show black in a color coordinate, for example blackening combinations of at least two selected from a red-based pigment, a blue-based pigment, a green-based pigment, a violet-based pigment, a yellow-based pigment, a cyanine-based pigment, and a magenta-based pigment. For example, a mixture of a red-based pigment, a blue-based pigment, and a green-based pigment to show black, and a mixture of a green-based pigment and a violet-based pigment to show black may be used.

Examples of the red-based pigment may include without limitation perylene-based pigments, anthraquinone-based pigments, dianthraquinone-based pigments, azo-based pigments, diazo-based pigments, quinacridone-based pigments, anthracene-based pigments, and the like, and combinations thereof. Specific examples of the red-based pigment may include without limitation perylene pigments, quinacridone pigments, naphthol AS, sicomin pigments, anthraquinones (sudan I, II, III, R), bis azos, benzopyrane, and the like, and combinations thereof.

Examples of the blue-based pigment may include without limitation metal phthalocyanine-based pigments, indanthrone-based pigments, indophenol-based pigments, and the like, and combinations thereof. Specific examples of the blue-based pigment may include without limitation phthalocyanine metal complexes such as copper phthalocyanine, chloro copper phthalocyanine, chloro aluminum phthalocyanine, titanyl phthalocyanine, vanadic acid phthalocyanine, magnesium phthalocyanine, zinc phthalocyanine, iron phthalocyanine, cobalt phthalocyanine, and the like, and combinations thereof.

Examples of the green-based pigment may include without limitation halogenated phthalocyanine-based pigments, and the like, and combinations thereof. Specific examples of the green-based pigment may include without limitation polychloro copper phthalocyanine, polychloro bromo phthalocyanine, and the like, and combinations thereof.

Examples of the violet-based pigment may include without limitation dioxazine violet, first violet B, methyl violet, indanthrene brilliant violet, and the like, and combinations thereof.

Examples of the yellow-based pigment may include without limitation tetrachloro isoindolinone-based pigments, hansa-based pigments, benzidine yellow-based pigments, azo-based pigments, and the like, and combinations thereof. Specific examples of the yellow-based pigment may include without limitation hansa yellow (10G, 5G, 3G, G, GR, A, RN, R), benzidine (G, GR), chrome yellow, permanent yellow (FGL, H10G, HR), anthracene, and the like, and combinations thereof.

Examples of the cyanine-based pigment may include without limitation non-metal phthalocyanines, merocyanines, and the like, and combinations thereof.

Examples of the magenta-based pigment may include without limitation dimethyl quinacridone, thio indigo, and the like, and combinations thereof.

Examples of the inorganic pigment may include without limitation carbon black, chromium oxide, iron oxide, titan black, titanium carbide, aniline black, and the like. Such an inorganic pigment can have high resistance characteristics, and may be used singularly or in a mixture of two or more kinds.

The organic pigment and the inorganic pigment may be used in a weight ratio of about 1:1 to about 10:1, for example about 2:1 to about 7:1. Within the above weight ratio range, processibility may be stable, and a low dielectric constant may be provided.

The photosensitive resin composition may further include a dispersing agent in order to improve dispersion of the pigment.

The pigment may be surface-pretreated with a dispersing agent, or the pigment and dispersing agent may be added together during preparation of the photosensitive resin composition.

The photosensitive resin composition may include the colorant in an amount of about 1 to about 40 wt %, for example about 1 to about 25 wt %, based on the total amount (total weight) of the photosensitive resin composition. In some embodiments, the photosensitive resin composition may include the colorant in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the colorant can be in a range from about any of the foregoing amounts to about any other of the foregoing amounts.

When the colorant is included in an amount within the above range, insulating properties may be improved, and high optical density, and improved processibility such as developability, and the like may be provided.

(F) Solvent

Examples of the solvent may include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol methylether, ethylene glycol dimethylether, ethylene glycol ethylether, propylene glycol monomethylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactate alkyl esters such as methyl lactate, ethyl lactate, and the like; alkyl hydroxy acetate esters such as methyl hydroxyacetate, ethyl hydroxyacetate, butyl hydroxyacetate, and the like; alkoxyalkyl acetate esters such as methoxymethyl acetate, methoxyethyl acetate, methoxybutyl acetate, ethoxymethyl acetate, ethoxyethyl acetate, and the like; alkyl 3-hydroxypropionate esters such as methyl 3-hydroxypropionate, ethyl 3-hydroxypropionate, and the like; alkyl 3-alkoxypropionate esters such as methyl 3-methoxypropionate, ethyl 3-methoxypropionate, ethyl 3-ethoxypropionate, methyl 3-ethoxypropionate, and the like; alkyl 2-hydroxypropionate esters such as methyl 2-hydroxypropionate, ethyl 2-hydroxypropionate, propyl 2-hydroxypropionate, and the like; alkyl 2-alkoxypropionate esters such as methyl 2-methoxypropionate, ethyl 2-methoxypropionate, ethyl 2-ethoxypropionate, methyl 2-ethoxypropionate, and the like; alkyl 2-hydroxy-2-methylpropionate esters such as methyl 2-hydroxy-2-methylpropionate, ethyl 2-hydroxy-2-methylpropionate, and the like; alkyl 2-alkoxy-2-methylpropionate esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketonate esters such as ethyl pyruvate, and the like, and combinations thereof. Additionally, the following solvents may be also used: N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like. These solvents may be used singularly or as a mixture of two or more.

Considering miscibility and reactivity, glycol ethers such as ethylene glycol monoethylether, ethylene glycol dimethylether, and the like; ethylene glycol alkylether acetates such as ethyl cellosolve acetate, and the like; esters such as 2-hydroxy ethyl propionate, and the like; diethylene glycols such as diethylene glycol monomethylether, and the like; propylene glycol alkylether acetates such as propylene glycol methylether acetate, propylene glycol propylether acetate, and the like, and combinations thereof may be used.

The photosensitive resin composition may include the solvent in a balance amount, for example about 50 to about 70 wt %, based on the total amount (total weight) of the photosensitive resin composition. In some embodiments, the photosensitive resin composition can include the solvent in an amount of about 50, 51, 52, 53, 54, 55, 56, 57, 58, 59, 60, 61, 62, 63, 64, 65, 66, 67, 68, 69, or 70 wt %. Further, according to some embodiments of the present invention, the amount of the solvent can be in a range from about any of the foregoing amounts to about any other of the foregoing amounts.

When the solvent is included in an amount within the above range, the photosensitive resin composition may have an appropriate viscosity resulting in improvement of processibility.

(G) Other Additive(s)

The photosensitive resin composition may further include one or more other additives. Examples of the additives may include without limitation malonic acid; 3-amino-1,2-propanediol; silane-based coupling agents including a vinyl group or a (meth)acryloxy group; leveling agents; fluorine-based surfactants; radical polymerization initiators, and the like, and combinations thereof, in order to prevent stains or spots during the coating, to adjust leveling, and/or to prevent pattern residue due to non-development.

Examples of the silane-based coupling agent may include without limitation trimethoxysilyl benzoic acid, γ-methacryl oxypropyl trimethoxysilane, vinyl triacetoxysilane, vinyl trimethoxysilane, γ-iso cyanate propyl triethoxysilane, γ-glycidoxy propyl trimethoxysilane, β-(3,4-epoxycyclohexyl)ethyltrimethoxysilane, and the like. They may be used singularly or as a mixture of two or more.

Examples of the fluorine-based surfactant may include without limitation commercial products, for example BM-1000® and BM-1100® (BM Chemie Inc.); MEGAFACE F 142D®, F 172®, F 173®, and F 183® (DAINIPPON INK KAGAKU KOGYO CO., LTD.); FULORAD FC-135®, FULORAD FC-170C®, FULORAD FC-430®, and FULORAD FC-431® (SUMITOMO 3M CO., LTD.); SURFLON S-112®, SURFLON S-113®, SURFLON S-131®, SURFLON S-141®, and SURFLON S-145® (ASAHI GLASS CO., LTD.); SH-28PA®, SH-190®, SH-193®, SZ-6032®, and SF-8428®, (TORAY SILICONE CO., LTD.), and the like, and combinations thereof.

The amount of the additive(s) may be easily adjusted depending on desired properties.

According to another embodiment, a black spacer manufactured using the photosensitive resin composition is provided. The black spacer has a structure of combining a light-blocking layer with a column spacer and may be obtained through one pattern-forming process.

The black spacer may be manufactured as follows.

(1) Coating and Film Formation

The photosensitive resin composition can be coated to have a desired thickness, for example, a thickness ranging from about 2 to about 25 μm, on a substrate which undergoes a predetermined pretreatment, using a spin or slit coating method, a roll coating method, a screen-printing method, an applicator method, and the like. Then, the coated substrate can be primarily heated (also referred to be as "pre-bake") at a temperature ranging from about 70 to about 100° C. for about 1 to about 10 minutes to remove a solvent.

(2) Exposure

The film may be radiated by an active ray ranging from about 200 to about 500 nm after positioning a mask having a half tone part for forming a light-blocking layer pattern and a full tone part for forming a column spacer pattern. The radiation can be performed by using a light source such as a mercury lamp with a low pressure, a high pressure, or an ultrahigh pressure, a metal halide lamp, an argon gas laser, and the like. An X ray, an electron beam, and the like may be also used. The light dose may vary depending on kinds of each component of the photosensitive resin composition, its combination ratio, and a dry film thickness. For example, a light dose may be about 500 mJ/cm$^2$ or less (with about 365 nm sensor) when a high pressure mercury lamp is used.

(3) Development

After the exposure process, an alkali aqueous solution can be used to develop the exposed film by dissolving and removing an unnecessary part except the exposed part, forming a pattern. The pattern can have a film step difference between light-blocking layer pattern and column spacer pattern.

(4) Post-Treatment

The image pattern obtained by the development may be secondarily heated (also referred to be as "post-bake") at about 200 to about 250° C. for about 15 to about 40 minutes in order to obtain a pattern having excellent heat resistance, light resistance, close contacting properties, crack resistance, chemical resistance, high strength, storage stability. The post-bake process may decrease film step difference between the light-blocking layer pattern and the column spacer pattern, since height and shape of the patterns are deformed. According to one embodiment, the thermally curing initiator included in the photosensitive resin composition is additionally thermally cured and further may improve reliability, heat resistance, and/or chemical resistance of a pattern.

Hereinafter, the present invention is illustrated in more detail with reference to examples. These examples, however, are not in any sense to be interpreted as limiting the scope of the invention.

(Preparation of Photosensitive Resin Composition)

Each component used in preparation of a photosensitive resin composition is as follows.

(A) Thermally Curing Initiator (A-1) HTP-65W made by NOF Corporation is used. The HTP-65W has one hour half-life at a temperature of 103° C.

(A-2) PERHEXA C made by NOF Corporation is used. The PERHEXA C has one hour half-life at a temperature of 111° C.

(A-3) PEROYL-L made by NOF Corporation is used. The PEROYL-L has one hour half-life at a temperature of 79.5° C.

(A-4) PERCUMYL P made by NOF Corporation is used. The PERCUMYL P has one hour half-life at a temperature of 173° C.

(B) Photopolymerization Initiator

OXE01 made by BASF Co. is used.

(C) Binder Resin (C-1) KBR101 made by Kyung-In Synthetic Co. as a cardo-based resin is used.

(C-2) BX-04 made by Nippon Shokubai as an acrylic-based resin is used.

(D) Photopolymerizable Compound

Dipentaerythritolhexaacrylate is used.

(E) Colorant (E-1) A mill base (Mikuni Co.) including OBP made by BASF Co. is used.

(E-2) A mill base (Tokushiki Co., Ltd.) including carbon black is used.

(F) Solvent (F-1) Propylene glycol monomethylether acetate is used.

(F-2) Ethylene glycol dimethylether is used.

(G) Additive

γ-glycidoxy propyl trimethoxysilane (S-510, Chisso Corp.) as a silane coupling agent is used.

EXAMPLES 1 AND 2 AND COMPARATIVE EXAMPLES 1 TO 3

Each component according to the compositions in the following Table 1 is mixed, preparing a photosensitive resin composition. Specifically, a thermally-curing initiator and a photopolymerization initiator are dissolved in a solvent, and the solution is sufficiently agitated for about 30 minutes at room temperature. Subsequently, a binder resin and a photopolymerizable compound are added thereto, and the resulting mixture is agitated for one hour. Subsequently, an additive and a colorant are added thereto, and the mixture is agitated for about 2 hours. The solution is three times filtered to remove impurities therein, preparing a photosensitive resin composition.

TABLE 1

| | | \(wt %\) | | | | |
|---|---|---|---|---|---|---|
| | | Examples | | Comparative Examples | | |
| | | 1 | 2 | 1 | 2 | 3 |
| (A) Thermally curing initiator | A-1 | 0.09 | — | — | — | — |
| | A-2 | — | 0.09 | — | — | — |
| | A-3 | — | — | — | 0.09 | — |
| | A-4 | — | — | — | — | 0.09 |
| (B) Photopolymerization initiator | | 0.47 | 0.47 | 0.47 | 0.47 | 0.47 |
| (C) Binder resin | C-1 | 4.95 | 4.95 | 4.98 | 4.95 | 4.95 |
| | C-2 | 4.95 | 4.95 | 4.98 | 4.95 | 4.95 |
| (D) Photopolymerizable compound | | 4.24 | 4.24 | 4.27 | 4.24 | 4.24 |
| (E) Colorant | E-1 | 6.0 | 6.0 | 6.0 | 6.0 | 6.0 |
| | E-2 | 4.25 | 4.25 | 4.25 | 4.25 | 4.25 |
| (F) Solvent | F-1 | 58.81 | 58.81 | 58.81 | 58.81 | 58.81 |
| | F-2 | 15.5 | 15.5 | 15.5 | 15.5 | 15.5 |
| (G) Additive | | 0.74 | 0.74 | 0.74 | 0.74 | 0.74 |

(Pattern formation of Black Spacer)

The photosensitive resin compositions according to Examples 1 and 2 and Comparative Examples 1 to 3 are respectively spin-coated to be less than or equal to 6 μm on a glass substrate and primarily pre-baked at 90° C. to remove the solvent therein, forming films. Subsequently, a mask having a half tone part for realizing a light-blocking layer pattern and a full tone part for realizing a column spacer pattern is positioned on the films and then, exposed to an active ray ranging from 300 to 450 nm with an exposure dose of 120 mJ/cm$^2$ by using a mercury light source. Subsequently, the exposed part of the film is left after removing the unnecessary part of the film by using an alkali aqueous solution to form a pattern. Subsequently, the pattern is secondarily post-baked at 220° C. for 20 minutes, forming the pattern of a black spacer.

Evaluation 1: Film Residual Rate after Secondary Heating (Post-Bake) of Black Spacer The thicknesses of the pattern of a black spacer before and after secondary heating (post-bake) are respectively measured by using a 3-D profiler, and the results are provided in the following Table 2.

The film residual rate (%) in the following is obtained as a percentage of thickness of the post-bake related to thickness before the post-bake.

Referring to Table 2, Examples 1 and 2 using a thermally curing initiator exhibit a high film residual rate and a desired step difference compared with Comparative Example 1 using no thermally curing initiator and Comparative Examples 2 and 3 using a different thermally curing initiator from the above thermally curing initiator. Accordingly, forming capability of a film step difference between light-blocking layer pattern and column spacer pattern after the post-bake and chemical resistance are excellent.

Evaluation 2: Elution of Black Spacer

The black spacer pattern are cut into 16 pieces having a size of 1 cm×1 cm, put in a glass bottle containing 5 mL of N-methylpyrrolidone, and allowed to stand in a 100° C. oven for 15 minutes, and then, color elution of the film is examined. The eluted color might be different depending on a used pigment and compared with pure N-methylpyrrolidone, and the results are provided in FIG. 1.

FIG. 1 is a photograph showing elution evaluation results of the black spacers according to Examples 1 and 2 and Comparative Examples 1 to 3.

Referring to FIG. 1, Examples 1 and 2 using a thermally curing initiator show excellent reliability compared with Comparative Example 1 using no thermally curing initiator and Comparative Example 3 using a different thermally-curing initiator from the above thermally curing initiator. Comparative Example 2 shows no step difference due to a half tone exposure, since the film is thermally cured during the pre-bake despite excellent reliability elution result.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A photosensitive resin composition, comprising
  (A) about 0.01 to about 3.0 wt % of a thermally curing initiator having a half-life of about one hour at a temperature ranging from about 100 to about 150° C.;

TABLE 2

| | Total black spacer pattern | | | Part of light-blocking layer pattern | | | Part of column spacer pattern | | |
|---|---|---|---|---|---|---|---|---|---|
| | Film thickness before post-bake (μm) | Film thickness after post-bake (μm) | Film residual ratio (%) | Film thickness before post-bake (μm) | Film thickness after post-bake (μm) | Film residual ratio (%) | Film thickness before post-bake (μm) | Film thickness after post-bake (μm) | Film residual ratio (%) |
| Ex. 1 | 6.10 | 5.1 | 83.6 | 3.53 | 3.5 | 99.2 | 2.57 | 1.6 | 62.3 |
| Ex. 2 | 6.20 | 5.74 | 92.5 | 3.62 | 3.48 | 96.1 | 2.58 | 2.26 | 87.6 |
| Comp. Ex. 1 | 6.05 | 3.62 | 59.8 | 3.62 | 3.16 | 87.3 | 2.43 | 0.46 | 18.9 |
| Comp. Ex. 2 | 6.43 | 5.82 | 90.5 | 6.10 | 5.75 | 94.3 | 0.33 | 0.07 | 21.2 |
| Comp. Ex. 3 | 6.18 | 3.81 | 61.7 | 3.54 | 3.21 | 90.7 | 2.64 | 0.60 | 22.7 |

(B) about 0.05 to about 10.0 wt % of a photopolymerization initiator;
(C) about 1 to about 20 wt % of a binder resin comprising a cardo-based resin and acrylic-based resin, wherein the acrylic-based resin does not include a repeating unit represented by the following Chemical Formula 1 below;
(D) about 1 to about 20 wt % of a photopolymerizable compound, wherein the photopolymerizable compound includes a monofunctional ester of (meth)acrylic acid having an ethylenic unsaturated double bond, a multifunctional ester of (meth)acrylic acid having at least one ethylenic unsaturated double bond, or a combination thereof and wherein the photopolymerizable compound is not the same as the binder resin, wherein the photopolymerizable compound comprises ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolac epoxy (meth)acrylate, or a combination thereof;
(E) about 1 to about 40 wt % of a colorant; and
(F) a balance amount of a solvent,
wherein the amounts of (A), (B), (C), (D), (E), and (F) are each based on the total weight of the photosensitive resin composition,
wherein the thermally curing initiator having a half-life of about one hour at a temperature ranging from about 100 to about 150° C. comprises di-t-butyl peroxy hexahydroterephthalate, 2,2-bis(t-butylperoxy)butane, 1,1-bis (t-butylperoxy cyclohexane), 2,2-bis (4,4-di-t-butylperoxy cyclohexyl)propane, or a combination thereof,
wherein the cardo-based resin includes two or more repeating units represented by the following Chemical Formula 1:

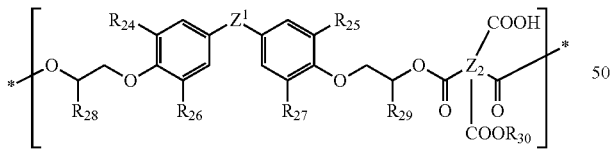

wherein:
$R_{24}$ to $R_{27}$ are the same or different and are each independently hydrogen, halogen, or substituted or unsubstituted C1 to C20 alkyl,
$R_{28}$ and $R_{29}$ are the same or different and are each independently hydrogen or —$CH_2OR_a$, wherein $R_a$ is a vinyl group, an acrylate group or a methacrylate group,
each $R_{30}$ is the same or different and each is independently hydrogen, substituted or unsubstituted C1 to C20 alkyl, substituted or unsubstituted C2 to C20 alkenyl, an acrylate group or a methacrylate group,
each $Z_1$ is the same or different and each is independently a single bond, —O—, —CO—, —$SO_2$—, —$CR_bR_c$—, —$SiR_dR_e$—, wherein $R_b$ to $R_e$ are the same or different and are each independently hydrogen or substituted or unsubstituted C1 to C20 alkyl, or a linking group selected from the following Chemical Formulae 2 to 12, and
each $Z_2$ is the same or different and is each independently an acid dianhydride residual group,

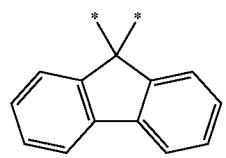

[Chemical Formula 2]

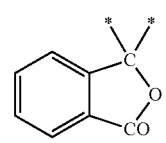

[Chemical Formula 3]

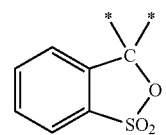

[Chemical Formula 4]

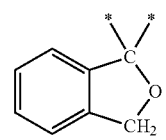

[Chemical Formula 5]

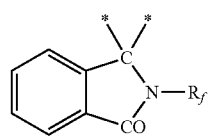

[Chemical Formula 6]

wherein in the above Chemical Formula 6, $R_f$ is hydrogen, ethyl, —$C_2H_4Cl$, —$C_2H_4OH$, —$CH_2CH=CH_2$, or phenyl,

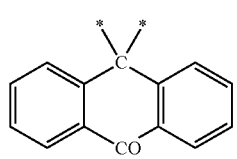

[Chemical Formula 7]

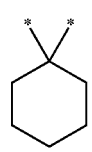

[Chemical Formula 8]

[Chemical Formula 9]

[Chemical Formula 10]

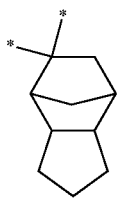

[Chemical Formula 11]

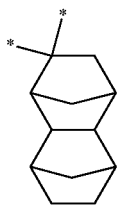

[Chemical Formula 12]

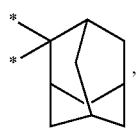, and wherein the acrylic-based resin is a copolymer of a first ethylenic unsaturated monomer and a second ethylenic unsaturated monomer that is copolymerizable with the first ethylenic unsaturated monomer and includes at least one acrylic-based repeating unit, wherein the term substituted refers to one substituted with a substituent including halogen, a hydroxyl group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

2. The photosensitive resin composition of claim 1, wherein the thermally curing initiator (A) has a half-life of about one hour at a temperature ranging from about 100 to about 120° C.

3. The photosensitive resin composition of claim 1, comprising the thermally curing initiator (A) in an amount of about 0.1 to about 10.0 wt % based on the total weight of the photosensitive resin composition excluding the solvent.

4. The photosensitive resin composition of claim 1, wherein the colorant comprises an organic pigment, an inorganic pigment, or a combination thereof,
the organic pigment comprises a black organic pigment, and
the inorganic pigment comprises carbon black, chromium oxide, iron oxide, titan black, titanium carbide, aniline black, or a combination thereof.

5. A black spacer of a display device manufactured using the photosensitive resin composition of claim 1, wherein the black spacer comprises a light-blocking layer combined with a column spacer.

6. The photosensitive resin composition of claim 1, wherein the thermally curing initiator having a half-life of about one hour at a temperature ranging from about 100 to about 150° C. comprises di-t-butyl peroxy hexahydroterephthalate.

7. The photosensitive resin composition of claim 1, wherein the thermally curing initiator having a half-life of about one hour at a temperature ranging from about 100 to about 150° C. comprises 2,2-bis(t-butylperoxy)butane.

8. The photosensitive resin composition of claim 1, wherein the thermally curing initiator having a half-life of about one hour at a temperature ranging from about 100 to about 150° C. comprises 1,1-bis(t-butylperoxy cyclohexane).

9. The photosensitive resin composition of claim 1, wherein the thermally curing initiator having a half-life of about one hour at a temperature ranging from about 100 to about 150° C. comprises 2,2-bis (4,4-di-t-butylperoxy cyclohexyl)propane.

* * * * *